US011992985B2

(12) United States Patent
Klammer et al.

(10) Patent No.: US 11,992,985 B2
(45) Date of Patent: May 28, 2024

(54) FILTER DEVICE

(71) Applicant: ENGEL AUSTRIA GmbH, Schwertberg (AT)

(72) Inventors: Guenther Klammer, Aschbach Markt (AT); Thomas Koepplmayr, Marchtrenk (AT); Gerhard Baeck, Schwertberg (AT); Raffael Johannes Rathner, Scharnstein (AT); Klaus Fellner, Steyr (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 18/219,814

(22) Filed: Jul. 10, 2023

(65) Prior Publication Data
US 2024/0009901 A1 Jan. 11, 2024

(30) Foreign Application Priority Data
Jul. 11, 2022 (AT) .............. A 50508/2022

(51) Int. Cl.
*B29C 45/24* (2006.01)
*B01D 27/08* (2006.01)
*B29C 45/17* (2006.01)

(52) U.S. Cl.
CPC .............. *B29C 45/24* (2013.01); *B01D 27/08* (2013.01); *B01D 2201/24* (2013.01); *B01D 2201/302* (2013.01); *B29C 2045/1739* (2013.01)

(58) Field of Classification Search
CPC ................................ B29C 45/24; B01D 27/08
See application file for complete search history.

(56) References Cited

U.S. PATENT DOCUMENTS

| 3,274,648 | A | * | 9/1966 | Orman | .................. B29C 48/254 425/197 |
| 3,684,419 | A | * | 8/1972 | Voight | .................... B29C 48/69 425/192 R |
| 3,924,989 | A | | 12/1975 | Althausen et al. | |
| 4,318,677 | A | | 3/1982 | Ullrich et al. | |

(Continued)

FOREIGN PATENT DOCUMENTS

CN 110053226 A * 7/2019
CN 209756022 12/2019
(Continued)

OTHER PUBLICATIONS

Machine translation DE19811273A1 (Year: 1999).*
(Continued)

*Primary Examiner* — Jacob T Minskey
*Assistant Examiner* — Wayne K. Swier
(74) *Attorney, Agent, or Firm* — Wenderoth, Lind & Ponack, L.L.P.

(57) ABSTRACT

A filter device for plasticized molding material includes a filter housing and a filter element arranged in the filter housing. The filter housing has at least two housing elements movable relative to each other. A drive is provided, via which the housing elements are movable between an open position and a closed position. The filter element is at least partially released in the open position of the housing elements and can preferably be taken out of the filter housing.

23 Claims, 6 Drawing Sheets

(56) References Cited

U.S. PATENT DOCUMENTS

| | | | | |
|---|---|---|---|---|
| 4,358,262 A | * | 11/1982 | Herbert | B29C 48/693 |
| | | | | 210/791 |
| 4,627,916 A | * | 12/1986 | Dorsam | B29C 48/69 |
| | | | | 210/488 |
| 4,728,279 A | | 3/1988 | Bellmer | |
| 5,783,223 A | * | 7/1998 | Anderson | B29C 48/694 |
| | | | | 425/185 |
| 6,027,328 A | | 2/2000 | Herbst | |
| 6,126,430 A | | 10/2000 | Coyle et al. | |
| 6,196,823 B1 | | 3/2001 | Coyle et al. | |

FOREIGN PATENT DOCUMENTS

| | | | | |
|---|---|---|---|---|
| CN | 211441090 | | 9/2020 | |
| CN | 113232268 | | 8/2021 | |
| CN | 216941586 U | * | 7/2022 | |
| CN | 114986848 | | 9/2022 | |
| DE | 1 529 952 | | 12/1969 | |
| DE | 2 252 201 | | 5/1974 | |
| DE | 30 43 217 | | 6/1982 | |
| DE | 84 24 818.1 | | 11/1984 | |
| DE | 4419405 A1 | * | 12/1995 | B29C 45/24 |
| DE | 196 17 768 | | 8/1997 | |
| DE | 19811273 A1 | * | 9/1999 | B29C 45/1753 |
| DE | 10 2005 061 770 | | 7/2007 | |
| DE | 102005061770 A1 | * | 7/2007 | B29C 47/0822 |
| DE | 20 2010 016 792 | | 5/2012 | |
| DE | 202010016792 U1 | * | 5/2012 | B29C 47/68 |
| DE | 20 2014 001 675 | | 6/2014 | |
| DE | 202014001675 U1 | * | 6/2014 | B29B 13/10 |
| EP | 0 008 705 | | 3/1980 | |
| EP | 875357 A1 | * | 11/1998 | B29C 45/24 |
| GB | 765383 | | 1/1957 | |
| JP | 57-185529 | | 11/1982 | |

OTHER PUBLICATIONS

Machine translation CN110053226A (Year: 2019).*
Machine translation CN216941586U (Year: 2022).*
Machine translation DE4419405A1 (Year: 1995).*
Machine translation EP0875357A1 (Year: 1998).*
Machine translation DE102005061770A1 (Year: 2007).*
Machine translation DE202010016792U1 (Year: 2012).*
Machine translation DE202014001675U1 (Year: 2014).*

* cited by examiner

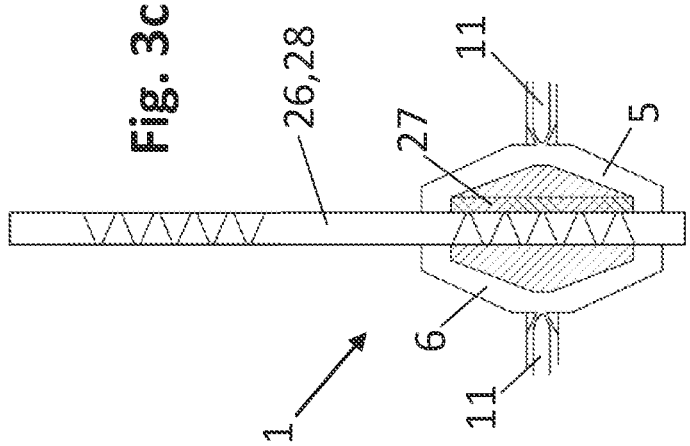
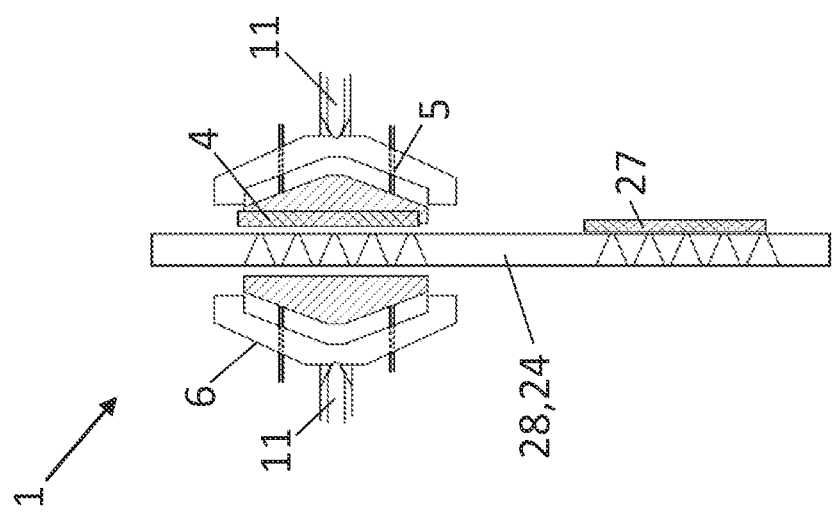
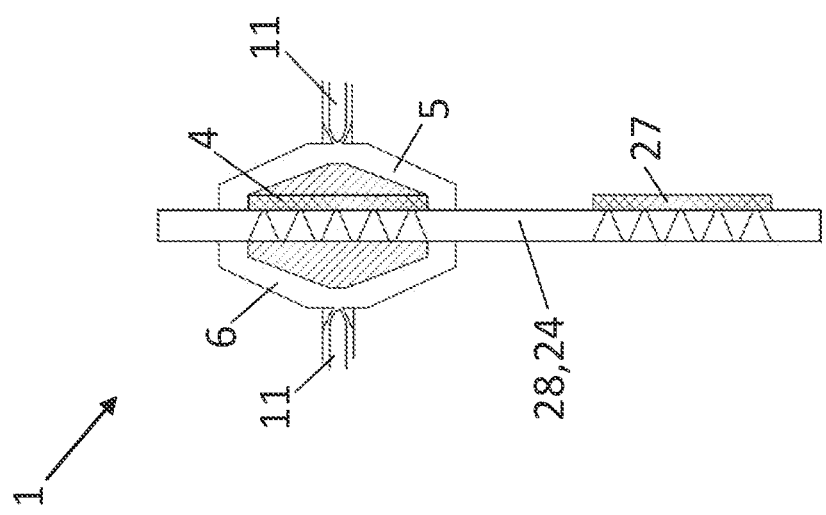

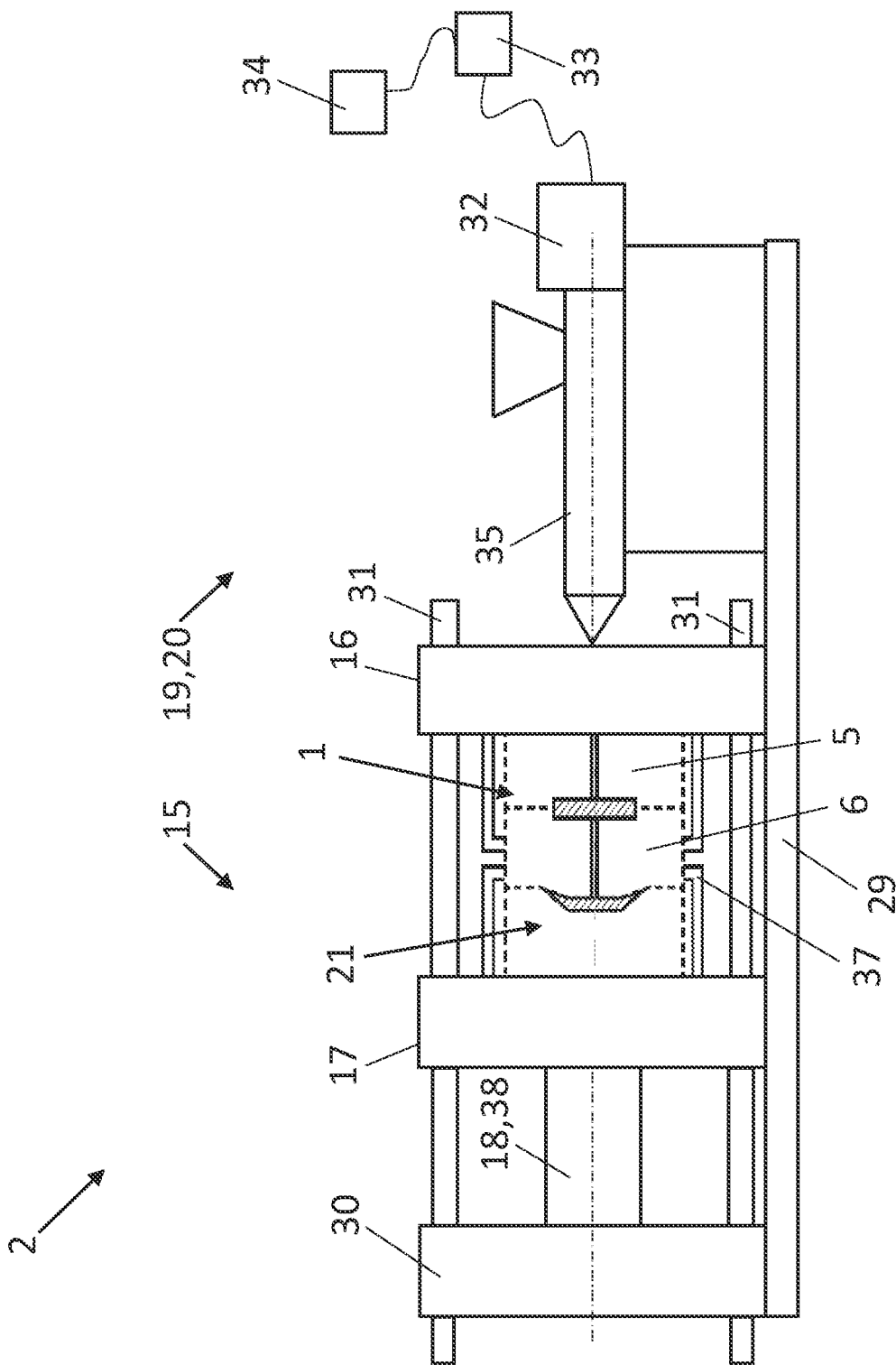

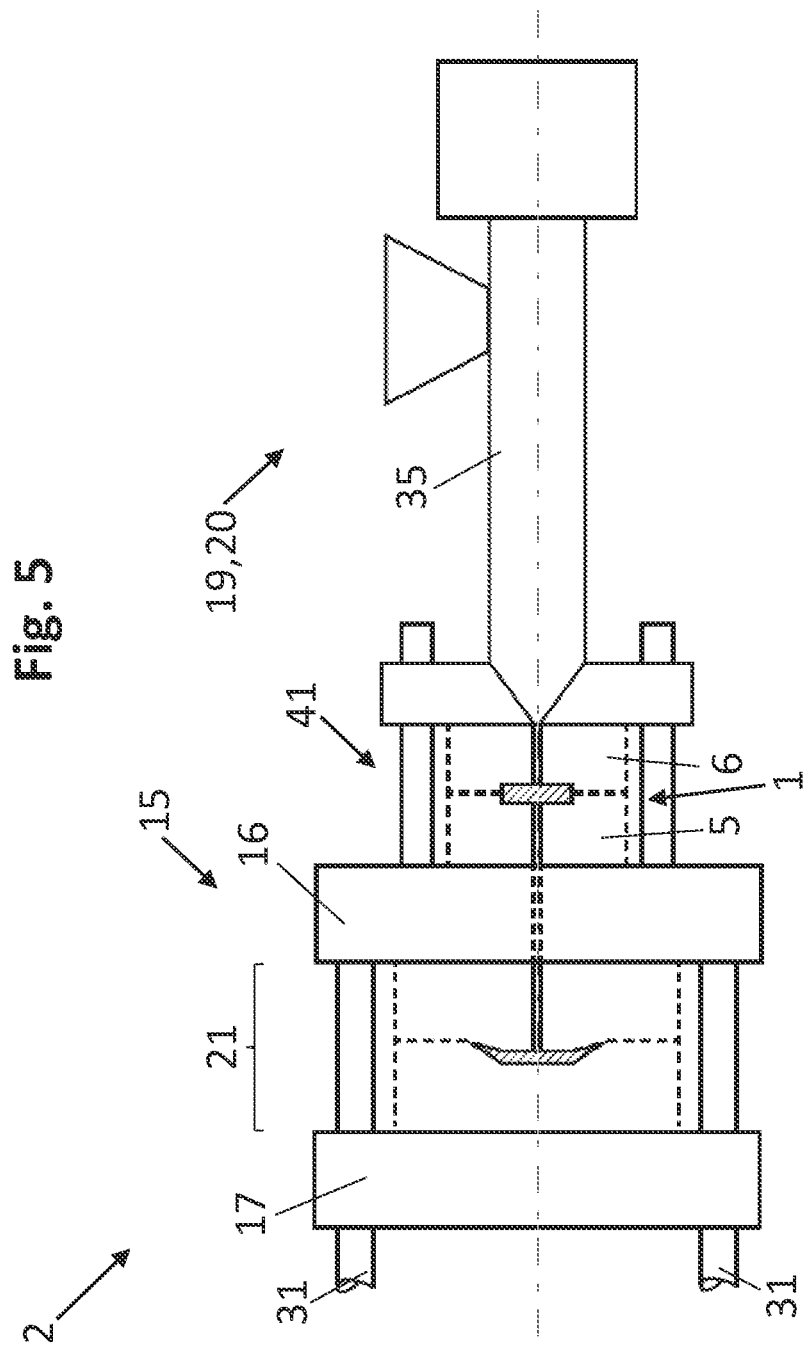

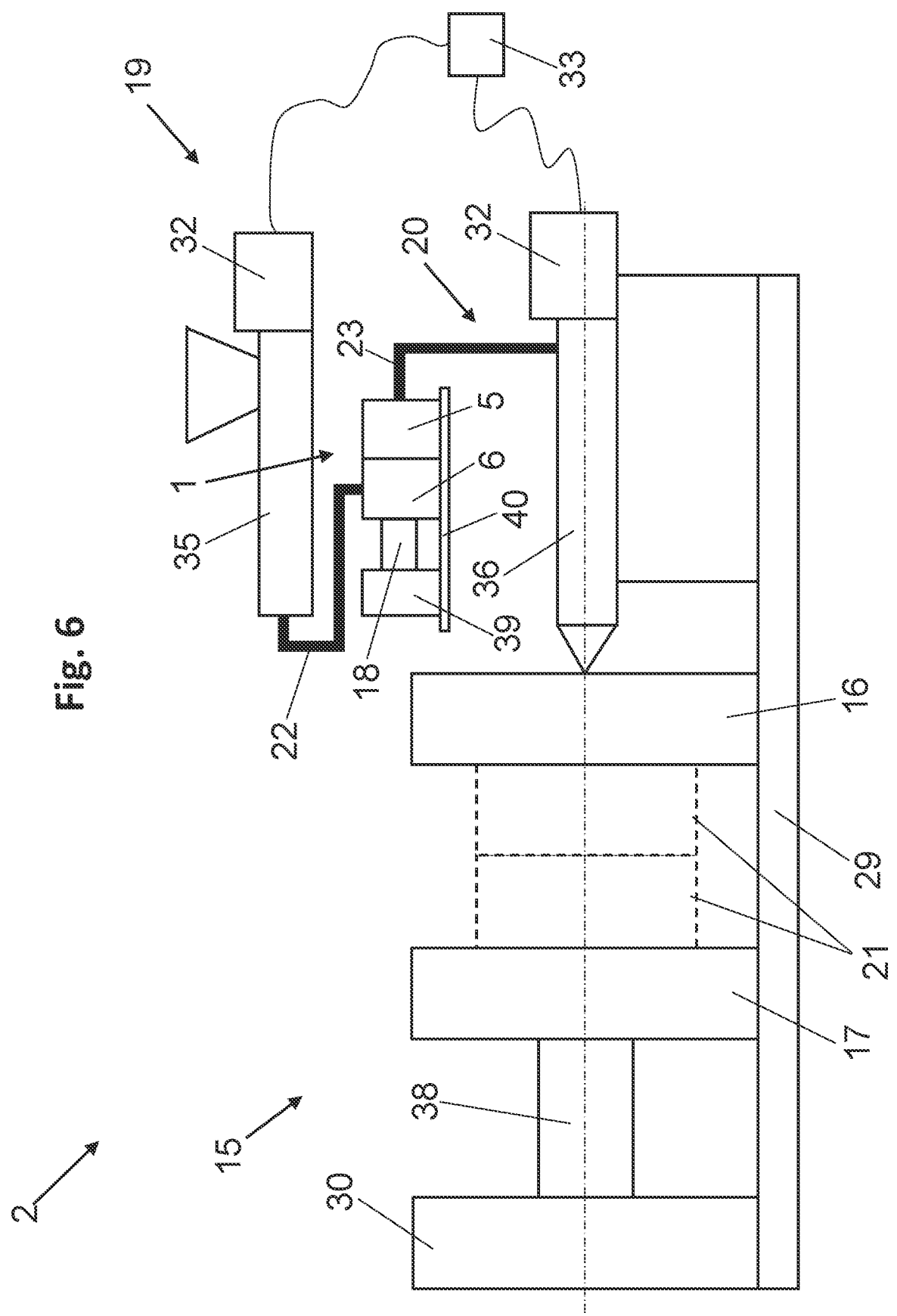

FILTER DEVICE

BACKGROUND OF THE INVENTION

The present invention relates to a filter device for plasticized molding material, in particular plasticized plastic, a molding machine with such a filter device, as well as a method for operating a filter device.

By molding machines may be meant injection-molding machines, transfer-molding machines, presses and the like. Molding machines in which the plasticized material is supplied to an open mold are also entirely conceivable. The state of the art is to be outlined below with reference to an injection-molding machine. This applies analogously to molding machines in general.

Generic filter devices for plasticized molding material, in particular plasticized plastic, comprise a filter housing and at least one filter element arranged in the filter housing, wherein a plasticized molding material is guided through the filter element in order to perform a filtration of the plasticized molding material.

It is known from the state of the art to process impure plastics as molding material to be plasticized. These plastics can be e.g. recyclates, material to be ground or agglomerates, which are used for example in a recycling or compounding application.

This topic is becoming ever more important, wherein through the recycling of materials to be plasticized (for example thermoplastics) they can be supplied for a new use or a new area of application and thus a marked advantage is created with respect to environmental friendliness.

However, in order to supply such materials to be plasticized for an injection-molding process, it is necessary to purify them, wherein the impurities are to be removed from the material to be plasticized.

For this purification or prepurification of the materials to be plasticized, it is known that, in a first step, the impure material is plasticized by a continuously operating plasticizing unit and is then purified by degassing processes and filter systems.

For this continuous filtration, for example, filter devices are known, such as from DE 20 2010 016 792 U1. A filter change is performed there as a rule in the plasticized state of the molding material, wherein handling the viscous hot molding material requires a manual operator intervention and is thus problematic in terms of safety. Corresponding extrusion filters cannot be used in injection molding because of the much higher process pressures.

After filtration and degassing, the plasticized material is cooled again and solidifies, wherein the purified material is usually brought directly into a form that is easy to process further, such as for example granules.

The granules produced from purified and degassed recycled material can then be used subsequently by an injection-molding process in an injection-molding machine.

It is also known to perform a filtration directly in the case of an injection-molding machine, such as follows for example from DE 84 24 818 U1. Here, the use of a filter in the injection nozzle with filter elements that can be screwed in is taught, wherein the filter surface area overall is small. These devices are suitable only for very low levels of contamination, as the small filter surface area is otherwise blocked after a short time.

However, a disadvantage of the known filter devices for a higher level of contamination of the plasticized molding material is that a filter cleaning is associated with a great deal of work, wherein the filter device—more precisely: the filter housing of the filter device—must be opened in order to make the filter element accessible and to be able to clean it of impurities or to replace it, after which the filter housing must then be closed again in order to prepare the filter device for the further process.

Specifically in the case of the use of recycled materials, wherein there is a greater contamination of the plasticized material, this results in very long downtimes, wherein the process has to be interrupted again and again in order to remove the impurities from the filter device.

Alternatively, complex devices, such as for example continuous extrusion filters or disk filters, are known, but these are associated with high acquisition costs, as well as a lot of effort.

This naturally has a negative effect on the productivity and/or the cost-efficiency of the process, whereby the use of recycled materials is not made particularly attractive to a user.

Furthermore, a direct use in the injection-molding process is unappealing due to the long downtimes, as in particular in the case of the injection-molding process and the large quantities of material to be plasticized being processed there per unit of time this does not seem to be profitable.

SUMMARY OF THE INVENTION

The object of the present invention is therefore to provide a filter device and a method for operating a filter device in which the disadvantages of the state of the art are at least in part improved and/or a more energy-efficient recycling of material to be plasticized can be implemented and/or a more energy-efficient purification of material to be plasticized is possible and/or a direct processing of material to be purified and plasticized is made possible and/or a more continuous, rapid or energy-saving possibility for filtering plasticized molding material is presented.

This object is achieved according to the invention by a filter device for plasticized molding material, in particular plasticized plastic, a molding machine with such a filter device, as well as a method for operating a filter device.

According to the invention, a filter device for plasticized molding material, in particular plasticized plastic, has a filter housing and at least one filter element arranged in the filter housing. The filter housing has at least two housing elements movable relative to each other, and at least one drive is provided, via which the housing elements are movable between an open position and a closed position, wherein the at least one filter element is at least partially released in the open position of the housing elements.

Preferably, the filter element can be taken out of the filter housing in the open position of the housing elements.

Forming the filter housing by at least two housing elements movable relative to each other and a drive, via which the housing elements are movable between an open position and a closed position, creates the possibility of automatically, efficiently and quickly releasing a filter element in order to be able to clean and/or change the filter element very quickly when it is blocked by impurities.

Thus, it is now no longer necessary to open a filter housing laboriously by hand, for example by loosening screw connections, in order to reach a filter element.

Due to this quick and easy possibility for changing and/or cleaning the filter element, the downtimes for filter cleaning and/or filter change can be drastically reduced, as a result of which the productivity and the energy efficiency can be increased.

The use of a recycled material is thus made much more attractive to a user, as a result of which the use of recycled materials can also be increased and a reduction in environmental impact can be achieved.

Furthermore, the possibility is created for quickly and effectively purifying plasticized molding material by the filter device before it is injected into a mold in the case of an injection-molding machine, wherein very large amounts of plasticized material can also be purified by the filter device, without having to accept long operational interruptions for cleaning the filter device, as a result of which a use of the filter device in the case of an injection-molding machine is made possible.

Such a use in the case of an injection-molding machine in turn makes it possible to supply recycled material directly to an injection-molding machine and makes a two-stage process for purification and subsequent further processing superfluous, as a result of which an advantage with respect to the energy efficiency is additionally created.

Through the filtering of the plasticized molding material directly in the molding process, the steps described at the beginning (such as for example the production of granules) can be omitted, which obviously represents a significant improvement in terms of complexity and economic efficiency.

A corresponding application of an embodiment of the present invention in the case of a recycling and/or compounding application can thus also be made considerably more attractive to a user, wherein the production costs and the production effort are minimized, whereby the environmental friendliness can be increased (through increased use).

Through an embodiment of the invention, it is made possible to allow the plasticized molding material to solidify between the at least two housing elements movable relative to each other together with the impurities collected by the at least one filter element and then to take this solidified molding material together with the at least one filter element (could also be called "filter cake" in some circumstances) out of the filter device to clean the filter device.

As mentioned, a filter device according to the invention can also be used in already known embodiments of the state of the art, as described for example in the introduction to the description, and can be subsequently installed.

By molding machines may be meant injection-molding machines, transfer-molding machines, presses and the like. Molding machines in which the plasticized material is supplied to an open mold are also entirely conceivable.

Within the meaning of the present document, by a filtration and/or a filtering of a plasticized molding material may be meant that foreign substances present in a plasticized molding material are, preferably mechanically, released, removed, discharged and/or separated at least partially from the plasticized molding material. This can thus also include separation methods.

A separating plane can be formed by the at least two housing elements, wherein in the open position a cavity is released on the separating plane, which cavity is enclosed by the at least two housing elements in a closed position.

The at least one filter element can be arranged, preferably braced, between the at least two housing elements.

Thus, for example, a filter element is formed substantially flat and in an open position is positioned between the at least two housing elements in a separating plane, wherein the filter element is braced between the at least two housing elements—preferably in a formed cavity—by transferring the at least two housing elements into a closed position with the aid of the at least one drive.

Preferably, a first housing element of the at least two housing elements represents a fixed housing element and a second housing element of the at least two housing elements represents a housing element movable relative to the fixed housing element by means of the at least one drive.

At least one guide element can be provided, which is formed to guide the at least two housing elements relative to each other during a transition between the open position and the closed position—and vice versa.

In addition:
a first housing element of the at least two housing elements can have at least one supply opening, and
a second housing element of the at least two housing elements can have at least one discharge opening,
wherein in a closed position a plasticized material can be supplied to the filter device via the at least one supply opening and can be discharged via the at least one discharge opening.

At least one nozzle, preferably a hot runner nozzle, particularly preferably a hot runner shut-off nozzle, can be connected to the at least one supply opening and/or discharge opening for supplying and/or discharging the plasticized material.

Preferably, the filter housing is equipped with at least one temperature control element, preferably in the form of temperature control channels for temperature control medium, which at least one temperature control element has the function of making the plasticized molding material in the filter housing solidify.

Thus, for example, that via the at least one temperature control element—if the filter element contains an impurity—the filter device, and thus the plasticized molding material present in the filter device, is selectively cooled and made to solidify, with the result that the impurities solidify together with the filter element and a residual quantity of plasticized molding material, wherein the at least two housing elements can then be moved into an open position and the solidified material with impurities can be taken out of the filter device along with the filter element.

A new and/or cleaned filter element can then be inserted into the at least two housing elements, the filter device can be transferred into a closed position via the at least one drive and the filter process and/or the filtration of the plasticized molding material can be continued.

During the filtration of the plasticized molding material, the at least one temperature control element is utilized to heat the filter device and/or the plasticized molding material present in the filter device and/or the filter element arranged in the filter device and/or to hold them at a desired temperature.

A flow behavior of the plasticized molding material can be influenced by the heating to and/or holding at a desired temperature.

Thus, for example the plasticized molding material in the filter device is additionally heated or warmed by the at least one temperature control element in order to increase a flowability of the plasticized molding material, whereby the plasticized molding material can be better filtered of impurities by the filter element and, where appropriate, filter elements with a finer mesh can even be inserted, such as could be used at lower temperatures of the plasticized molding material.

Preferably, the plasticized molding material is brought by the at least one temperature control element to a temperature which lies above the processing temperature in a later molding process for the plasticized molding material.

The at least one filter element can be taken out of the filter housing together with the solidified molding material in the open position of the at least two housing elements.

At least one ejector device can be provided, which is formed to eject the at least one filter element, preferably with solidified molding material, in an open position.

At least one handling device can be provided, which is formed to take a filter element out of the filter device in an open position of the filter device and/or to supply it to the filter device.

Protection is furthermore sought for a molding machine, in particular injection-molding machine, with a filter device according to the invention.

The filter device can be connected to a clamping unit of the molding machine, wherein the at least two housing elements of the filter device are movable between an open position and a closed position through an opening movement and/or closing movement of a movable platen relative to a fixed platen.

Preferably:
plasticized material from a plasticizing unit of the molding machine can be supplied to the filter device and the filtered, plasticized material can be transferred to an injection unit of the molding machine, and/or
plasticized material from the injection unit of the molding machine can be supplied to the filter device and the filtered, plasticized material can be supplied directly to a mold cavity of a mold.

Protection is furthermore sought for a method for operating a filter device, in particular a filter device according to the invention, for plasticized molding material, in particular plasticized plastic, wherein:
plasticized molding material is filtered in a filter device by means of a filter element and,
to clean and/or change the filter element, a filter housing of the filter device is opened by means of a drive, with the result that the filter element is released.

Preferably, the filter device has a filter element change device, preferably the filter element change device is formed as a cassette filter (as shown for example below by the embodiment represented in FIGS. 2a to 2c or FIGS. 3a to 3c, as well as the associated description of the figures).

A cassette filter can have two or more filter elements, wherein a first filter element in an engaged position is located in a melt stream of the plasticized molding material in the filter device, in order to perform a filtration of the plasticized molding material.

In the meantime, a further filter element of the cassette filter is released and is not in contact with the plasticized molding material.

While the first filter element is in an engaged position, the further filter element of the cassette filter can be cleaned of impurities or changed.

If the first filter element has a greater loading and/or higher level of impurity, via the cassette filter the further filter element can be brought into an engaged position via a filter element change device, wherein a filtration of the plasticized material by the further filter element takes place and the first filter element is released for cleaning and/or changing.

The filter element change device is formed similarly to a cassette deck and has two or more receiving devices for filter elements, wherein a receiving device can selectively be brought into an engaged position with the plasticized molding material and/or a released filter element can be positioned out of or in the receiving device by a filter element change device (preferably an actuator thereof).

The filter element change device can for example be formed as a plate screen changer, piston screen changer, cassette screen changer and/or belt filter.

The filter element change device can be formed to change and/or replace the filter element in an open position of the filter device.

If a belt filter is provided as filter element change device, it can be provided that the belt filter is repositioned at intervals (when the housing elements are in an open position), wherein blocked filter regions or impurities of the filter device can be moved out of the filter housing by the filter element change device, in order not to impair the ongoing process of the filter device.

At least one sensor can be provided in the filter device, for example in order to detect a signal characteristic of a state and/or a contamination of the plasticized molding material and/or the filter device and/or the filter element.

A corresponding sensor can be formed as a pressure sensor, temperature sensor, ultrasonic sensor, flow sensor, color sensor, rheometer and/or spectrometer.

A filter blocking, filter contamination and/or filter coating can for example be determined by the measurement of a pressure before the filter device and after the filter device in the flow direction of the plasticized molding material, wherein the pressure difference prevailing between the two measurements can represent a meaningful measure thereof.

At least one control or regulating unit can be provided, which is formed to control and/or regulate the at least one drive.

The control or regulating unit can be supplied with at least one signal characteristic of a contamination, blocking and/or coating of the filter element and/or of the filter device, wherein the control or regulating unit can be formed to determine that a cleaning and/or a change of the filter element is performed when this characteristic signal reaches and/or exceeds a predefinable threshold value.

To change or clean the filter device, the control or regulating unit can be formed to actuate the at least one drive in such a way that the at least two housing elements are transferred from a closed position into an open position.

The control or regulating unit can be formed to make the plasticized molding material in the filter housing solidify by means of the at least one temperature control element before the at least two housing elements are transferred from a closed position into an open position.

The solidified material can automatically be taken out of the filter housing by a handling device.

At least one further filter device can be provided, and the plasticized molding material can be selectively at least partially, in particular completely, supplied to the at least one further filter device, preferably while the (first) filter device is being cleaned and/or changed.

The at least one further filter device can be formed as an embodiment of the present invention and/or be implemented according to a known embodiment of the state of the art.

Thus, for example, if the filter device is being used for filtration of the plasticized molding material and has an increased level of impurity and/or coating, the plasticized molding material is diverted to the at least one further filter device, with the result that the filter device is relieved of load in order to be able to perform a cleaning and/or a change of the filter device.

BRIEF DESCRIPTION OF THE DRAWINGS

Further advantages and details of the invention are revealed by the figures and the associated description of the figures, in which:

FIGS. 3a-3c shows an embodiment of a filter element change device,

FIG. 4 shows an embodiment of a molding machine,

FIG. 5 shows a further embodiment of a molding machine, and

FIG. 6 shows a third embodiment of a molding machine.

DETAILED DESCRIPTION OF THE INVENTION

Figure 1:
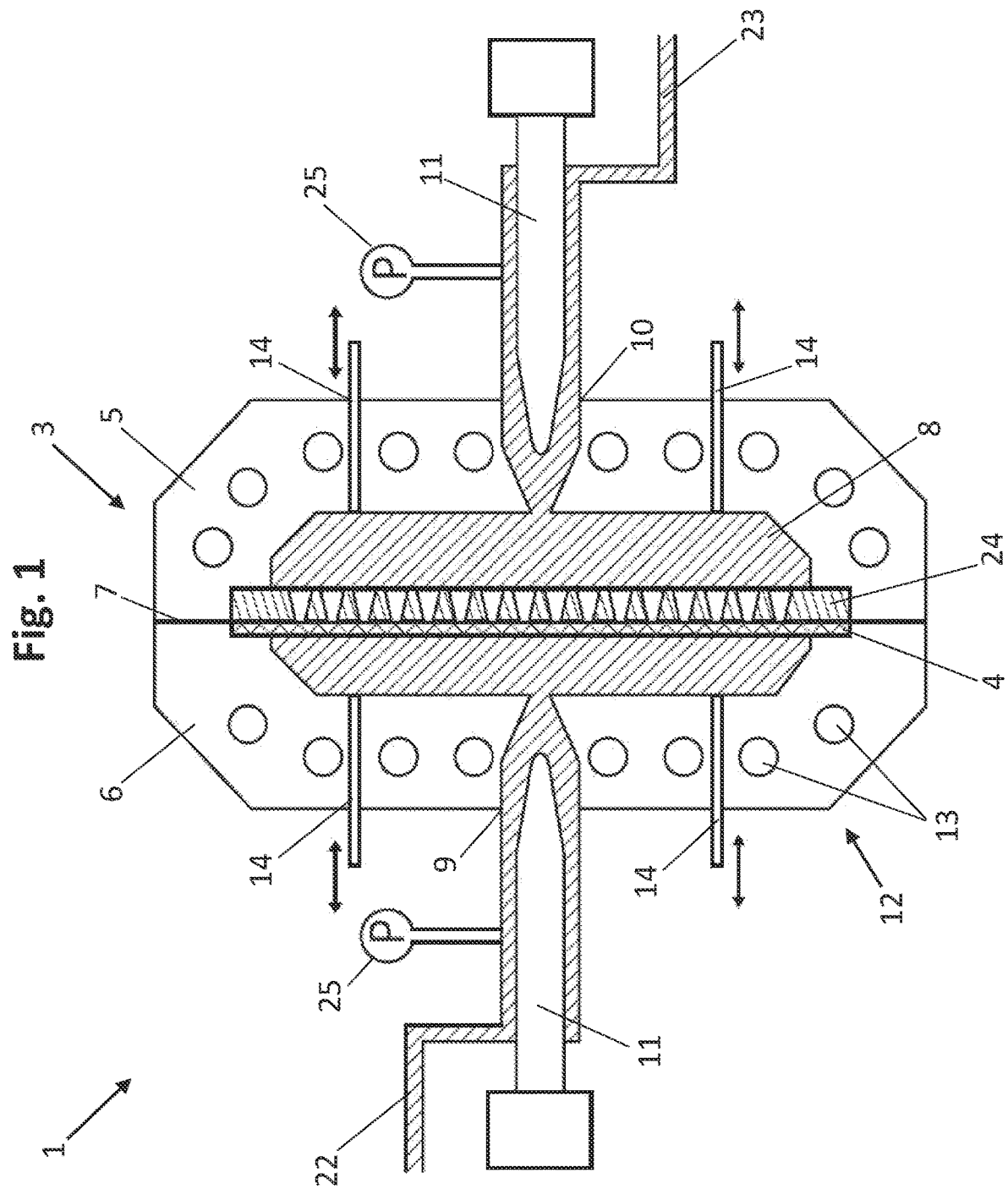
FIG. 1 shows a first embodiment of a filter device.

FIG. 1 shows a first embodiment of a filter device 1, which has a filter housing 3 and a filter element 4 arranged in the filter housing 3.

The filter housing 3 of this embodiment is implemented by the two housing elements 5, 6.

In this embodiment the first housing element 5 is implemented as a fixed housing element 5 and the second housing element 6 is formed as a housing element 6 movable relative to the first housing element 5.

A separating plane 7 between the housing elements 5, 6 is formed by the two housing elements 5, 6, wherein in the open position a cavity 8 is released on the separating plane 7, which cavity 8 is enclosed by the at least two housing elements 5, 6 in a closed position.

With the aid of a drive 18, the movable housing element 6 can be displaced linearly relative to the fixed housing element 5, with the result that the inside (the cavity 8) of the filter housing 3 is released in an open position, with the result that the filter element 4 is also released.

In a closed position (as represented in FIG. 1) the movable housing element 6 is placed and preferably pressed against the fixed housing element 5, whereby the filter element 4 is mounted and in particular braced between the fixed housing element 5 and the movable housing element 6.

Furthermore, the filter housing 3 has a supply opening 9 and a discharge opening 10. In detail, the supply opening 9 is provided in the movable housing element 6 and the discharge opening 10 is provided in the fixed housing element 5.

The filter device 1 moreover has a hot runner shut-off nozzle 11, which is arranged at the supply opening 9 and is formed to close a supply line 22 off from the cavity 8 as required.

In the same way, a hot runner shut-off nozzle 11 is arranged at the discharge opening 10 in order to separate the cavity 8 off from a discharge line 23 as required.

During operation of the filter device 1, plasticized molding material is supplied, via the supply line 22, to the cavity 8 of the filter housing 3 via the hot runner shut-off nozzle 11 and the supply opening 9.

After being supplied via the supply opening 9, the plasticized molding material is conducted through the filter element 4, whereby the plasticized molding material is filtered by the filter element 4, with the result that only filtered, plasticized molding material passes through the filter element 4 and impurities or contaminants remain on or in the filter element 4.

After filtration of the plasticized molding material by the filter element 4, the filtered, plasticized molding material is in turn discharged from the filter housing 3 via the discharge opening 10 and supplied to the discharge line 23 via the hot runner shut-off nozzle 11.

In order to support the filter element 4 in the flow direction of the plasticized molding material and to protect it from damage by the volume flow, a supporting plate 24, which supports the filter element 4 in the direction of the volume flow of the plasticized molding material, is moreover provided in the mold cavity 8 between the fixed housing element 5 and the movable housing element 6.

Before and after the filter housing 3 in the area of the hot runner shut-off nozzle 11, pressure sensors 25 are arranged which are formed to determine a prevailing pressure of the plasticized molding material or a signal characteristic of the pressure of the plasticized molding material before and after the filter housing 3.

Through these pressures of the plasticized molding material before and after the filter housing 3—more precisely: with the aid of a pressure gradient before and after the filter housing 3—a value characteristic of the filter blocking, filter coating and/or filter contamination can be defined, wherein a filter change and/or a filter cleaning can be carried out when a predefined limit value is exceeded or reached.

If a corresponding value is reached and/or a filter change and/or filter cleaning becomes necessary, the hot runner shut-off nozzles 11 of this embodiment are closed, whereby the cavity 8 is separated off from the supply line 22 and the discharge line 23 without there being the danger of plasticized molding material present in the supply line 22 and/or the discharge line 23 curing.

The plasticized molding material present in the cavity 8, together with the residues and contaminants as well as deposits, is then cooled and thus cured with the aid of the temperature control element 12 of the filter housing 3.

In this embodiment the temperature control element 12 is implemented by the temperature control channels 13, wherein a temperature control medium (for example water), which can be utilized to control the temperature of, preferably cool, the filter housing 3 and the components present in the filter housing 3 as well as the plasticized molding material, flows in the temperature control channels 13.

After cooling and curing of the molding material present in the cavity 8, the movable housing element 6 is displaced linearly relative to the fixed housing element 5 and the cavity 8 and/or the filter element 4 is released on the separating plane 7.

After release of the filter element 4, the filter element 4, together with the supporting plate 24 and the cured molding material as well as the contaminants and deposits present therein, can be taken out of the cavity 8.

The ejector devices 14, which are movable, as represented by the arrows, relative to the fixed housing element 5 and the movable housing element 6, can serve to take this cured molding material out or eject it together with the filter element 4 and the supporting plate 24.

To eject the cured molding material together with the supporting plate 24 and the filter element 4, the ejector devices 14 formed pin-shaped are thus displaced in the direction of the cavity 8 in order to expel the cured molding material together with the supporting plate 24 and the filter element 4 from the recesses, forming the cavity 8, of the housing elements 5, 6.

After demolding and/or ejection of the solidified molding material together with the filter element 4 and the supporting plate 24, a new or cleaned supporting plate 24 with a new or cleaned filter element 4 can be positioned between the housing elements 5, 6 and via a drive 18 the movable housing element 6 can be placed against the fixed housing element 5 in order to clamp and/or brace the supporting plate 24 and the filter element 4 between the housing elements 5, 6.

In turn, the hot runner shut-off nozzles 11 can then be opened in order to continue the process of the filtration by the filter element 4 and the filter device 1.

Figure 2C:
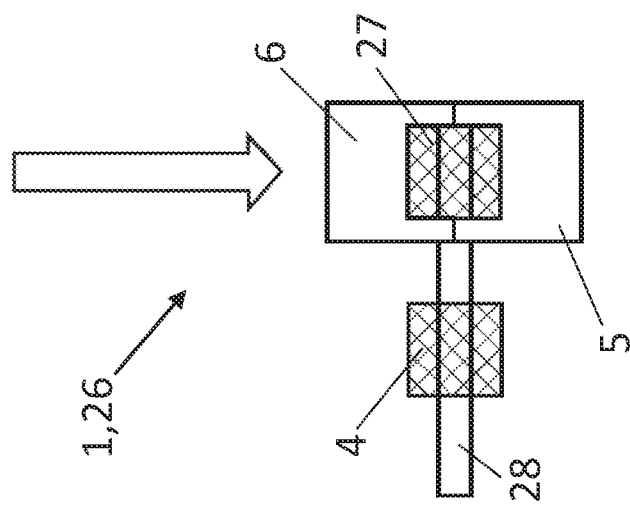
FIGS. 2a-2c is a schematic representation of a filter element change device.
Figure 2B:
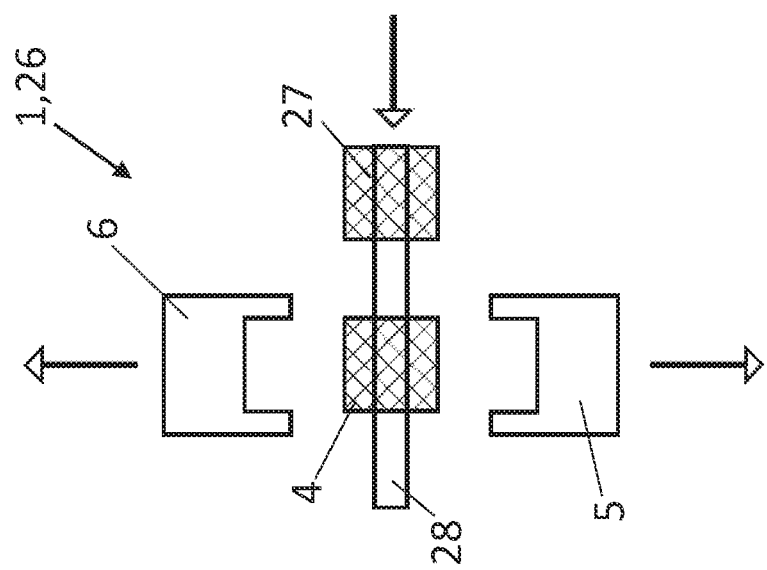
Figure 2A:
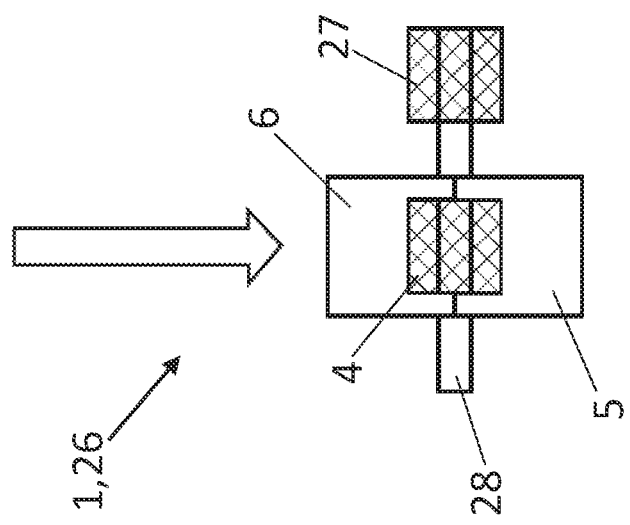

A change of the filter element 4, where appropriate even together with the supporting plate 24, out of and into the filter device 1 can be effected in an automated manner via a filter change device 26, as illustrated schematically, for example, by FIGS. 2a to 2c.

Here, FIGS. 2a to 2c show a schematically presented representation of a filter change device 26 and FIGS. 3a to 3c show a more specific embodiment of such a device.

The embodiment represented of FIGS. 2a to 2c again has, according to an embodiment of the invention, a first and a second housing part 5, 6, wherein the filter element 4 is arranged between the housing parts.

FIGS. 3a to 3c show an embodiment of a filter device 1 as known from FIG. 1 with a filter change device 26.

The filter change device 26 of FIG. 3 is implemented by a supporting plate 24 linearly displaceable by a drive 18, which linearly displaceable supporting plate 24 has two receivers for filter elements 4, 27 and is movable between two positions, in which positions the receivers with filter element 4, 27 arranged therein are in engagement with the filter device 1.

This filter change device 26 has a (first) filter element 4 and a (further) second filter element 27, which can be alternately added to a volume flow of plasticized molding material (illustrated here by the arrows) in order to filter the plasticized molding material and/or to remove impurities from it.

Correspondingly (see FIG. 2a and FIG. 3a), first of all a first filter element 4 is located in the filter device 1 in order to filter the volume flow of plasticized molding material.

If the first filter element 4 now has too great a coating (level of impurity), a filter change can be carried out.

For the measurement of a coating, a pressure can for example (as already described previously) be measured before and after the filter element 4 and via the pressure difference between these two pressures—when the pressure difference becomes too great—the coating of the filter element 4 can be referred to indirectly.

The cyclic filter change represents an alternative solution, wherein, according to empirical values, the filter elements 4 are changed after a certain number of plasticizing cycles have been carried out.

During a filter change (such as is represented by FIG. 2b and FIG. 3b), the volume flow of plasticized molding material is briefly interrupted (for example by closing hot runner shut-off nozzles 11) and—if the housing elements 5,6 are in an open position—the first filter element 4 is taken out of the filter device 1 and replaced with the second filter element 27 via a change system 28.

According to FIG. 3b it can also be provided that, even before the filter change (if the housing elements 5, 6 are in an open position), the contaminated filter element 4, together with the molding material solidified in the filter housing 3 before the housing parts 5, 6 are opened, is expelled from the housing parts 5, 6 via the ejector device 14.

Then, after the change has been effected, the volume flow of plasticized molding material can be started again and supplied to the second filter element 27 (see FIG. 2c and FIG. 3c).

The filter element 4 can then be cleaned while the second filter element 27 is being used and exchanged into the filter device 1 again once a coating of the second filter element 27 becomes too great.

The molding machine 2 represented by way of example in FIG. 4 is an injection-molding machine and has an injection unit 20 and a clamping unit 15, which are arranged together on a machine frame 29.

The machine frame 29 could alternatively also be formed multi-part.

The clamping unit 15 has a fixed platen 16, a movable platen 17 and an end plate 30.

The movable platen 17 is movable relative to the machine frame 29 via a symbolically represented drive 18 (for example a knuckle joint mechanism).

In this embodiment the drive 18 of the clamping unit 15 also serves as the drive 18 of the filter device 1 (which will be discussed in even more detail later).

Mold halves of a mold 21 can be clamped or fitted (represented dashed) on the fixed platen 16 and the movable platen 17.

The fixed platen 16, the movable platen 17 and the end plate 30 are mounted and guided relative to each other by the rails 31.

The mold 21 represented closed in FIG. 4 has at least one cavity. An injection channel, via which a plasticized material can be supplied to the plasticizing unit 19, leads to the cavity.

FIG. 4 shows a molding machine 2 with an injection unit 20, which in this embodiment has an injection screw and is thus also used for plasticizing a material to be plasticized.

The injection unit 20 of this embodiment has a barrel 35 and a plasticizing screw arranged in the barrel 35. This plasticizing screw is rotatable about an axis of rotation as well as movable axially along the axis of rotation in the conveying direction.

These movements are driven via a schematically represented drive unit 32. This drive unit 32 preferably comprises a rotary drive for the rotational movement and a linear drive for the axial injection movement.

The plasticizing unit 19 (and thus the injection unit 20) is in signaling connection with a control or regulating unit 33. Control commands are for example output to the plasticizing unit 19 and/or the drive unit 32 by the control or regulating unit 33.

The control or regulating unit 33 can be connected to an operating unit and/or a display device 34 or can be an integral constituent of such an operating unit.

It can be provided that the control or regulating unit 33 of the molding machine 2 at least partly undertakes the function of the control or regulating device 33 of the plasticizing unit 19, is formed as the latter or alternatively even is implemented independently and/or separately from the latter.

In this embodiment of FIG. 3 the filter device 1 is formed as part of the mold 21, wherein the mold 21 has several separating planes. Such molds 21 are also often called stack molds or three-plate molds.

The filter device 1, with the fixed housing element 5 and the movable housing element 6, forms a first separating plane 7 of the three-plate mold.

The movable housing element 6 of the filter device is connected in a movement-locking manner to the fixed mold part of the mold 21 (precisely: formed in a single part with the fixed mold part of the mold 21), wherein the second separating plane of the mold is formed by the fixed mold part and the movable mold part of the mold 21.

The structure represented in FIG. 4 is to be understood purely schematically, wherein dimensions and design details of a corresponding three-plate mold with a filter device would be to be adapted and can vary.

Thus, from the plasticizing unit 19 and/or injection unit 20, the plasticized molding material is introduced directly into the filter device 1 in order to filter the plasticized molding material, wherein, after filtration, the filtered, plasticized molding material is transferred directly into a mold cavity of the mold 24, where it solidifies to form a molded part and can then be ejected.

In a manufacturing process, the procedure can be such that during the manufacturing cycles it is always only the mold 21 that is opened in order to eject the finished products and additionally the separating plane 7 of the filter device 1 is additionally also opened by the drive 18 and the movement of the movable platen 17 after a predefinable number of cycles or if a filter change becomes necessary.

The transferring of the filter device 1 between a closed position and an open position can be controlled or regulated for example by the closure mechanism 37 shown in FIG. 4, wherein either an opening between movable housing element 6 and fixed housing element 5 or an opening between fixed mold part and the movable mold part of the mold 21 via the drive 18 is allowed.

This closure mechanism 37 can be formed for example as a locking device and can hold the filter device 1 closed when the clamping unit 15 is opened, with the result that the filter device 1 is not also opened every time the clamping unit 15 is opened.

If a filter change becomes necessary, the closure mechanism 37 can release or actively drive the movable housing element 6 relative to the fixed housing element 5 during an opening of the clamping unit 15, in order to transfer the filter device 1 into an open position.

During this opening of the movable housing element 6 relative to the fixed housing element 5, the closure mechanism 37 can be formed to fix the movable mold part relative to the fixed mold part in order to prevent the movable mold part from opening relative to the fixed mold part.

The closure mechanism 37 can be connected for example to the control or regulating unit 33 and can be controlled and/or regulated by the control or regulating unit 33.

Such a procedure or such a structure has the striking advantage that no additional drive 18 needs to be provided, but rather the already existing drive 18 of the clamping unit 15 (implemented here for example as a knuckle joint mechanism 38) can be utilized.

Existing molding machines 2 and/or injection-molding machines from the state of the art can thus also be retrofitted with a filter device 1.

The embodiment of FIG. 5, in comparison with FIG. 4, shows an arrangement of the filter device 1 on a side of the fixed platen 16 facing away from the mold 21.

Here, the filter device 1 is again downstream of the plasticizing unit 19 and the injection unit 20 in the flow direction of the plasticized molding material, wherein, after filtration by the filter element 4, the plasticized molding material is supplied to the mold 21.

In this embodiment of FIG. 5 the filter device 1 has a filter closing unit 41, which can move the movable housing part 6 relative to the fixed housing part 5 via rails and a closure plate between a closed position and an open position using a drive 18 not represented here.

Through a corresponding design, the possibility of a filter device 1 to be activated independently and separately from the clamping unit 15 is created, wherein for example during an opening movement of the clamping unit 15 a filter change can simultaneously be carried out via the filter closing unit 41.

The remaining features of the embodiment of FIG. 5 substantially correspond to that of FIG. 4.

An embodiment like that shown by FIG. 4 or 5, in which the plasticizing unit 19 is combined with the injection unit 20 through an injection screw, is also called a single-stage injection-molding machine.

The embodiment of a molding machine 2 according to FIG. 6, on the other hand, shows a two-stage process, in which the plasticizing unit 19 is formed separate from the injection unit 20.

As can be seen in FIG. 6, the molding machine 2 depicted—more precisely: this injection-molding machine—has a plasticizing unit 19, which plasticizes a material to be plasticized via a plasticizing screw.

This plasticizing screw is arranged in the barrel 35 drivable rotationally by the drive unit 32, in order to plasticize the material to be plasticized by shearing, shear heat and optionally externally introduced heat.

The plasticized molding material is then supplied from the plasticizing unit 19 via the supply line 22 of the filter device 1 to the filter device 1.

In the filter device 1, the plasticized molding material is again filtered and transferred to the injection unit 20 via the discharge line 23 of the filter device 1.

The injection unit 20 formed by an injection plunger in the injection cylinder 36 then injects the plasticized material into a cavity of the mold 21.

The injection plunger is arranged linearly over the drive unit 32 in the injection cylinder 36.

In this embodiment the filter device 1, more precisely: the movable housing element 6, is drivable relative to the fixed housing element 5 by means of a drive 18 formed separate from the clamping unit 15.

This drive 18 of the embodiment of FIG. 6 is implemented similarly to a small clamping unit, wherein the fixed housing element 5 is connected to a filter end plate 39 via a filter frame 40.

The drive 18, which is implemented as a linear drive, preferably a piston-cylinder unit or a knuckle joint mechanism, and is formed to move the movable housing element 6 relative to the fixed housing element 5 between an open position and a closed position, is provided between the filter end plate 39 and the movable housing element 6.

The drive 18 can be connected to the control or regulating unit 33 and can be controlled and/or regulated by the control or regulating unit 33.

It could also be provided that, in an embodiment of FIG. 6, a filter change device 26 (as represented for example by FIGS. 2a-2c or FIGS. 3a-3c) is used in order to minimize downtimes during the filter change.

Such an embodiment is preferably advantageous in the case of materials to be plasticized with particularly high levels of contamination, wherein a change and/or a cleaning of the filter element 4 can be performed independently of a movement of the clamping unit 15.

The remaining features of the embodiment of FIG. 6 substantially correspond to that of FIG. 4.

LIST OF REFERENCE NUMBERS 1 filter device
2 molding machine
3 filter housing
4 filter element
5 first (fixed) housing element
6 second (movable) housing element
7 separating plane 8 cavity
9 supply opening
10 discharge opening
11 hot runner shut-off nozzle
12 temperature control element
13 temperature control channel
14 ejector device
15 clamping unit
16 fixed platen
17 movable platen
18 drive
19 plasticizing unit
20 injection unit
21 mold
22 supply line
23 discharge line
24 supporting plate
25 pressure sensor
26 filter change device
27 further filter element
28 change system
29 machine frame
30 end plate
31 rail
32 drive unit
33 control or regulating unit
34 operating unit and/or display device
35 barrel
36 injection cylinder
37 closure mechanism
38 knuckle joint mechanism
39 filter frame
40 filter end plate
41 filter closing unit

The invention claimed is:

1. A filter device for a plasticized molding material, comprising:
    a filter housing formed by first and second housing elements, at least one of the first and second housing elements being movable relative to the other of the first and second housing elements;
    at least one filter element arranged in the filter housing; and
    at least one drive via which the at least one of the first and second housing elements is movable between an open position and a closed position, wherein the at least one filter element is at least partially released by a movement of the at least one of the first and second housing elements into the open position, and
    wherein the at least one filter element is releasably arranged between the first and second housing elements.

2. The filter device according to claim 1, wherein a separating plane is formed by the first and second housing elements, wherein a cavity is enclosed by the first and second housing elements in the closed position, and wherein the cavity is released on the separating plane in the open position of the first and second housing elements.

3. The filter device according to claim 1, wherein the first housing element is a fixed housing element and the second housing element is movable relative to the fixed first housing element by the at least one drive.

4. The filter device according to claim 3, further comprising at least one guide element which is formed to guide the first and second housing elements relative to each other during a transition from the open position to the closed position, and during a transition from the closed position to the open position.

5. The filter device according to claim 1, wherein:
    the first housing element has at least one supply opening; and
    the second housing element has at least one discharge opening,
    wherein in the closed position the plasticized material can be supplied to the filter device via the at least one supply opening and can be discharged via the at least one discharge opening.

6. The filter device according to claim 5, further comprising at least one nozzle, wherein the at least one nozzle is connected to the at least one supply opening or the at least one discharge opening for respectively supplying or discharging the plasticized material.

7. The filter device according to claim 1, wherein the filter housing is equipped with at least one temperature control element, wherein the at least one temperature control element is configured to make the plasticized molding material in the filter housing solidify.

8. The filter device according to claim 7, wherein the at least one filter element can be taken out of the filter housing together with the solidified molding material in the open position of the first and second housing elements.

9. The filter device according to claim 1, further comprising at least one ejector device configured to eject the at least one filter element in the open position.

10. A molding machine comprising the filter device according to claim 1.

11. The molding machine according to claim 10, wherein the filter device is connected to a clamping unit of the molding machine, wherein the at least one of the first and second housing elements of the filter device is movable between the open position and the closed position through an opening movement or closing movement of a movable platen relative to a fixed platen.

12. The molding machine according to claim 10, further comprising an injection unit, wherein
    plasticized material from a plasticizing unit of the molding machine can be supplied to the filter device, and the filtered, plasticized material can be transferred to the injection unit of the molding machine, or
    plasticized material from the injection unit of the molding machine can be supplied to the filter device, and the filtered, plasticized material can be supplied directly to a mold cavity of a mold.

13. A method for operating a filter device for a plasticized molding material, the filter device comprising:
    a filter housing formed by first and second housing elements, at least one of the first and second housing elements being movable relative to the other of the first and second housing elements;
    a first filter element arranged in the filter housing; and
    at least one drive via which the at least one of the first and second housing elements is movable between an open position and a closed position, wherein the first filter element is at least partially released by a movement of the at least one of the first and second housing elements into the open position, and
    wherein the first filter element is releasably arranged between the first and second housing elements,
    the method comprising:
    filtering the plasticized molding material in the filter device with the first filter element; and to clean or change the first filter element, opening the filter housing of the filter device by the at least one drive so as to release the first filter element.

14. The method according to claim 13, wherein the filter device is a first filter device, and a second filter device is provided, wherein the method further comprises selectively supplying the plasticized molding material at least partially to the second filter device.

15. The filter according to claim 1, wherein the plasticized molding material is plasticized plastic, wherein the at least one filter element is removable from the filter housing in the open position of the first and second housing elements, and wherein the at least one filter element is releasably braced between the first and second housing elements.

16. The filter device according to claim 6, wherein the at least one nozzle is a hot runner nozzle.

17. The filter device according to claim 16, wherein the hot runner nozzle is a hot runner shut-off nozzle.

18. The filter device according to claim 7, wherein the at least one temperature control element comprises temperature control channels for a temperature control medium.

19. The filter device according to claim 9, wherein the at least one ejector device is configured to eject the at least one filter element together with solidified molding material in the open position.

20. The molding machine according to claim 10, wherein the molding machine is an injection-molding machine.

21. The method according to claim 13, wherein the plasticized molding material is plasticized plastic.

22. The method according to claim 14, wherein the selective supplying of the plasticized molding material is performed while the first filter device is being cleaned or changed.

23. The method according to claim 14, wherein the plasticized molding material is supplied completely to the second filter device.

* * * * *